Jan. 24, 1939.     A. E. ROY     2,144,853
VACUUM POWER CONTROL APPARATUS
Filed Oct. 15, 1934     3 Sheets-Sheet 1
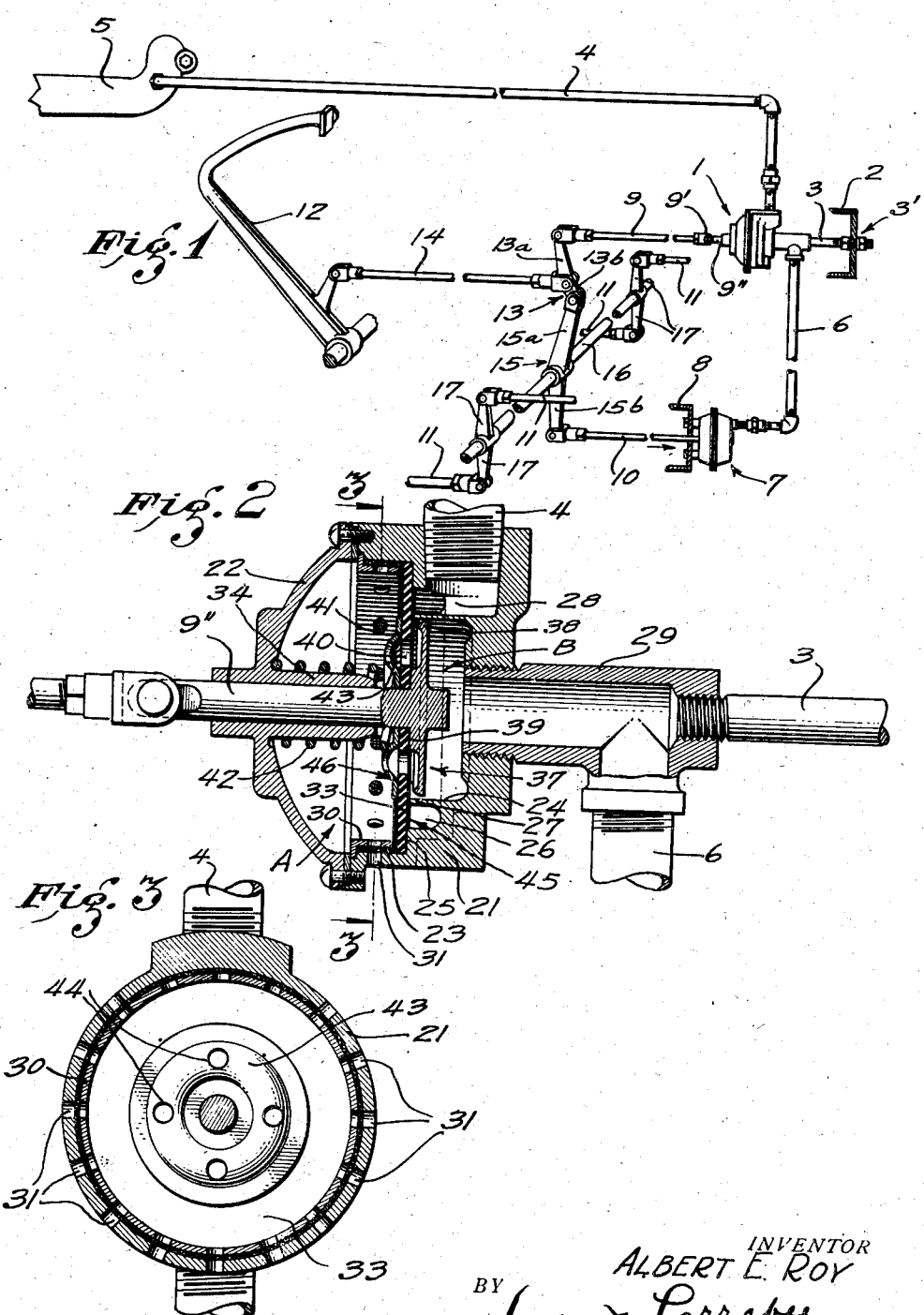
INVENTOR
ALBERT E. ROY
BY Larrabee
his ATTORNEY.

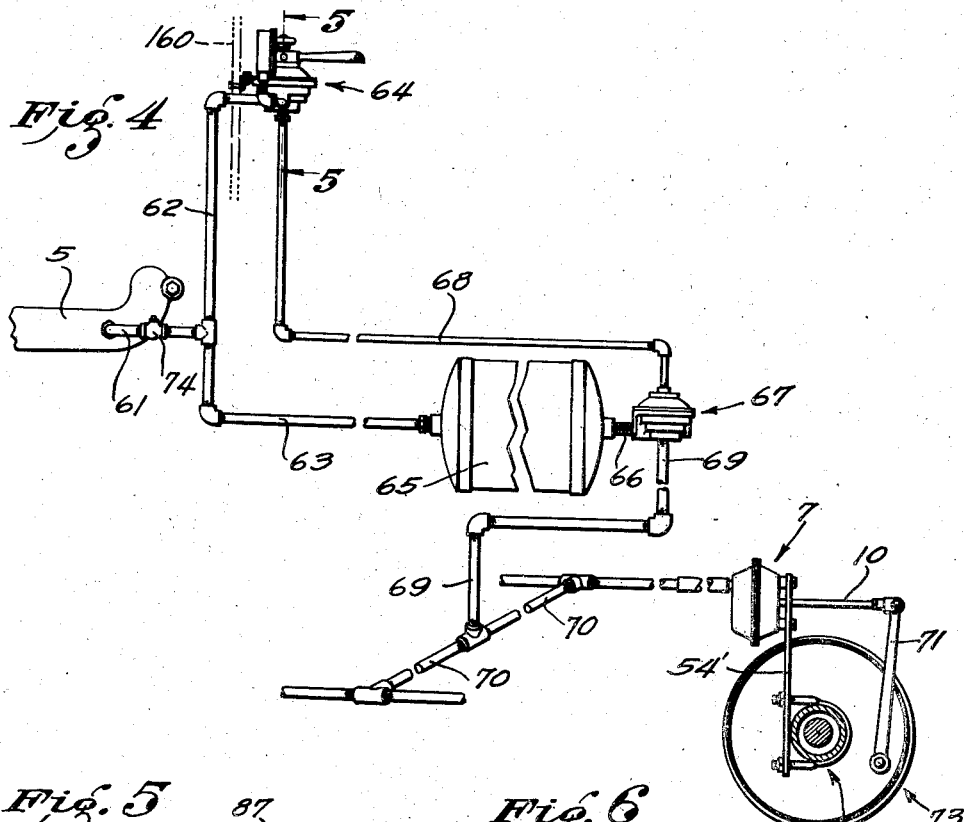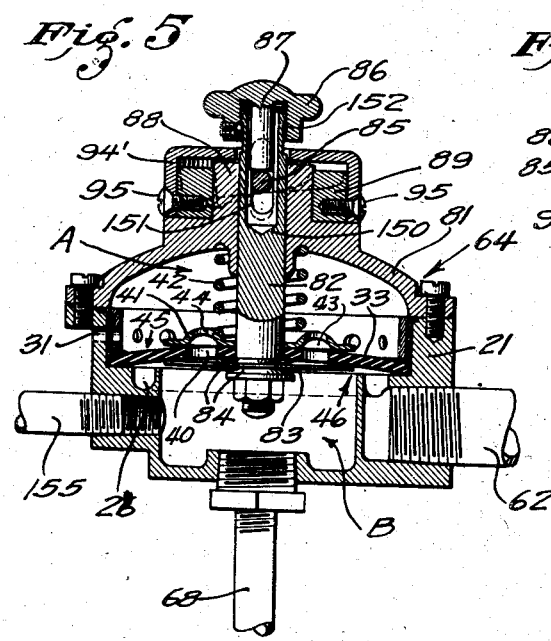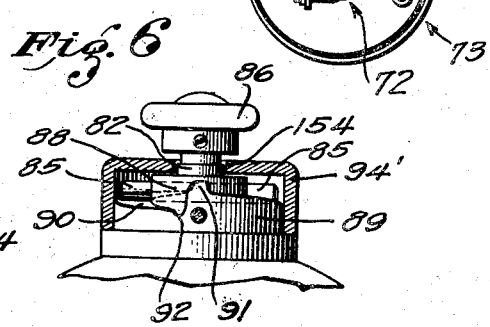

Jan. 24, 1939.  A. E. ROY  2,144,853
VACUUM POWER CONTROL APPARATUS
Filed Oct. 15, 1934  3 Sheets-Sheet 3
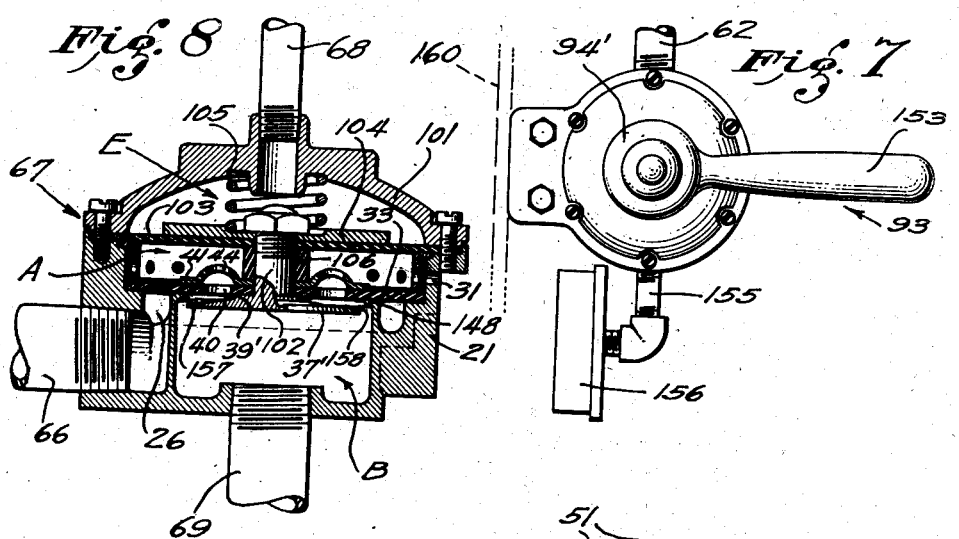
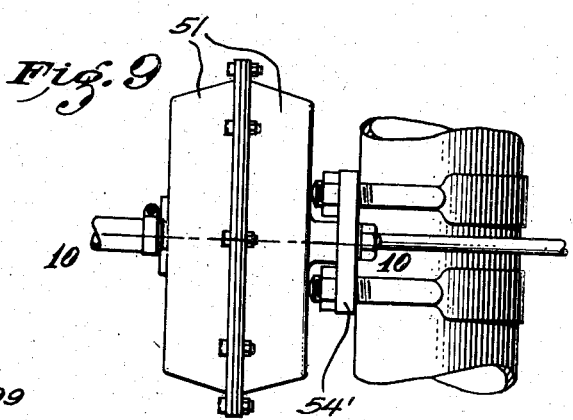
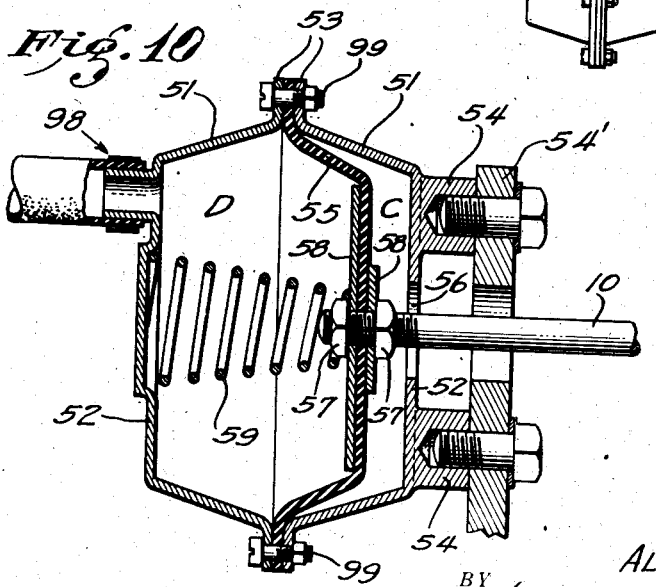
INVENTOR
ALBERT E. ROY
BY
his ATTORNEY.

Patented Jan. 24, 1939

2,144,853

UNITED STATES PATENT OFFICE 2,144,853

VACUUM POWER CONTROL APPARATUS

Albert E. Roy, Los Angeles, Calif., assignor to Vacuum Power Brake Company, Los Angeles, Calif., a corporation of California Application October 15, 1934, Serial No. 748,272

11 Claims. (Cl. 303—54)

This invention relates to vacuum power control apparatus, and more particularly to apparatus which is operated manually in such a manner to utilize the suction created in the intake manifold of an internal combustion engine for controlling the brakes of an automobile, truck, or trailer or other vehicle, whereby the manual effort of applying the brakes is reduced to a minimum.

Another object of this invention is to provide a vacuum power control apparatus which is so arranged that the control valve structure thereof may be rigidly mounted to the vehicle frame instead of suspended on or carried by a brake rod.

Another object is to provide a vacuum power control apparatus which reduces to a minimum the manual effort required to effect operation of the brakes of trucks, trailers or other vehicles, but which does not sacrifice the sensitiveness obtained by manual control.

Another object is to provide a vacuum power control apparatus for vehicle brakes which is so connected with a mechanical brake mechanism that the brake bands are caused to engage the brake drums and equalize before the apparatus is brought into play whereby the additional braking force supplied through the apparatus is applied uniformly to the several brakes.

An object of this invention is to provide a novel valve for such a vacuum power control apparatus adapted to control both the application of sub-atmospheric and atmospheric air pressure to a pressure responsive device connected mechanically with the brakes of vehicles.

Another object of this invention is to provide a novel valve of the above character which with but slight change in its construction may be used to perform different functions in various parts of the control apparatus.

Another object of this invention is to provide a novel valve which is positive in its action, while possessing the required flexibility of operation for proper control of vehicle brakes and which is simple in construction and upkeep.

Another object of this invention is to provide a novel regulating means for preventing overbraking or excess application of sub-atmospheric pressure to the pressure responsive devices connected with the brakes.

Another object of this invention is to provide a novel hand actuated operating means for a vacuum power control apparatus of the above character.

Another object of this invention is to provide an apparatus of the above character which is so arranged that should any elements thereof fail or should the vacuum lines break for any reason the brakes may still be mechanically operated by manual control, thereby enabling the driver to maintain control even though the apparatus is entirely out of commission.

Another object of this invention is to provide a control apparatus which is particularly sturdy and reliable of construction, easily installed, and capable of withstanding the excessive use and abuse without failure, thereby providing a control apparatus particularly suited for use on large trucks and their trailers.

Certain modifications may be apparent to one versed in the art and such modifications may well be made without departing from the spirit of the invention as hereinafter described or hereinafter defined in the appended claims.

The invention includes the parts and combination of parts more particularly hereinafter described and claimed.

Other objects, advantages and features of invention may appear from the accompanying drawings, the subjoined detail description and the appended claims.

The accompanying drawings illustrate the invention in some of the forms which I at present deem preferable.

Figure 1 is a substantially diagrammatical, partially perspective view and side elevational view of my apparatus in one of its forms showing the associated parts of the vehicle braking apparatus and a fragment of the intake manifold of a vehicle engine.

Fig. 2 is a longitudinal sectional view of the control valve structure taken along a vertical plane with the elements thereof shown in their normal positions.

Fig. 3 is a transverse sectional view thereof taken on line 3—3, Fig. 2.

Fig. 4 is a fragmentary substantially diagrammatical side elevational view partly in perspective of a modified form of the vacuum power control apparatus with co-acting portions of the vehicle shown fragmentarily, and the installation being shown as particularly applied to a trailer braking mechanism.

Fig. 5 is an enlarged sectional view of the hand controlled valve, taken on line 5—5, Fig. 4, with the elements thereof shown in their open or partially open position and showing the adjustment device for regulating the vacuum power applied by the valve.

Fig. 6 is a fragmentary elevational view of the upper portion of the hand control valve shown in Fig. 4 and viewed at right angles thereto with the operating handle shown in section.

Fig. 7 is a reduced plan view of the hand valve particularly disclosed in Figs. 5 and 6.

Fig. 8 is a longitudinal sectional view of the relay control valve shown in Fig. 4 with the elements thereof in their normal positions.

Fig. 9 is a reduced plan view of the booster unit incorporated in both apparatus shown in Figs. 1 and 4, but illustrated in connection with the installation shown in Fig. 4.

Fig. 10 is an enlarged sectional view of the booster unit taken on line 10—10, Fig. 9.

Referring to the drawings, particularly Figs. 1–3, it will be seen that the apparatus here embodied comprises generally a control valve structure 1, to be described in more detail hereinafter, which is supported from a suitably positioned frame member 2 of a vehicle by a bar 3 either by a rigid connection 3' or a ball and socket joint means more particularly hereinafter referred to. A manifold line 4 communicated between the valve structure 1 and an intake manifold 5 of a vehicle engine (not shown). The valve structure is also connected through a booster line 6 to a booster unit 7, to be described in more detail hereinafter, and which is preferably suitably supported from another frame member 8 of the vehicle.

The control valve structure 1 and booster unit 7 are connected mechanically by rods 9 and 10 respectively with the brake rods 11 and brake pedal arm 12 of the vehicle braking system by a link and lever arrangement as follows: The rod 9 connected through a pivotal connection with the valve stem or rod 9" of the control valve structure 1, and is pivotally connected to the upper or longer arm 13a of a link 13, which link in its normal position shown in Fig. 1 slopes downwardly and rearwardly. The link 13 which also acts as a lever is pivotally joined intermediate its ends to a connecting rod 14 which is in turn pivotally connected to the brake pedal arm 12. The lower or shorter arm 13b of the lever 13 is connected to the upper portion 15a of a double ended rocker lever 15 which is secured at its mid-portion to a cross shaft 16 suitably journaled by means, not shown, from the vehicle frame. The other or lower portion 15b of the rocker lever 15 is joined to the aforementioned rod 10 that extends directly from the booster unit 7. The extreme portions of the cross shaft are provided with four lever arms 17 which are attached to the usual rods 11 that extend to and actuate the four brake rods 11.

Reference is now directed to Figs. 2 and 3 which show in detail the construction of the control valve structure 1. The mechanism of the valve structure 1 is enclosed in a main housing or body member 21 which is recessed at its forward side and covered by a dished cover 22 between which is interposed a gasket to make an air tight connection. The recess in the housing comprises a major diametered cylindrical portion 23 adjacent the cover, a concentric smaller diametered portion 24, forming therebetween an annular shoulder 25. An annular channel 26 is formed in the shoulder radially outwardly of the smaller portion 24 of the recess and separated therefrom by a thin annular wall 27. The channel 26 connects through a passage 28 with the pipe line 4 from the manifold. The rear or closed side of the housing 21 is provided with a screwthreaded aperture which receives the threaded end of a hollow stem 29 which is attached to the supporting rod or bar 3. The booster line 6 is suitably attached to the stem 29.

The major diametered portion 23 of the housing 21 receives a cylindrical ring 30 which is provided with an outwardly flanged end adapted to be retained between the cover 22 and the housing. The ring 30 and walls of the housing opposite the major portion 23 are pierced by a plurality of radiating atmospheric ports 31. A screen 32 is interposed between the ring 30 and housing wall and is secured to ring 30 in any suitable manner and serves to prevent foreign matter entering the housing.

A flexible partition 33, preferably formed of rubber or analogous material, is positioned with its periphery between the axially inner end of the ring 30 and the shoulder 25 and is not clamped, but instead, floats therebetween. The cover 22 is provided with a centrally disposed sleeve 34 that forms a bearing for, and in which slides a valve stem 9" that extends through the flexible plate 33 into the smaller recessed portion 24 and is here provided with a valve head 37. The valve head is substantially flat and thin. Its outer periphery is provided with a small bead or rim 38 which is directed toward the flexible plate, while adjacent the stem the valve head is provided with an annular boss 39 which bears against the central portion of the flexible plate 33. The boss 39 normally spaces the beaded rim 38 of the valve head 37 from the flexible floating plate 33.

Axially inwardly from the periphery of the valve head 37, the flexible plate 33 is pierced by a plurality of exhaust apertures 40. A tension plate 41 of sheet material fits upon the stem 9" and is urged under tension against the side of the flexible plate 33 opposite from the valve head by a helical spring 42 which surrounds the stem and bears against the cover 22. The tension plate 41 is provided with a channel 43 in its side and opening towards the flexible plate and opposite the apertures 40 therethrough. Said channel is pierced by exhaust holes 44 to insure communication between the smaller portion 24 and the atmosphere through the ports 31.

In brief, the interior of the control valve structure is divided into a chamber A open to the atmosphere, a chamber B communicating with the booster line 6 and the channel 26 communicating with the manifold line 4.

The marginal portion of the flexible plate forms a flap valve portion 45 which bears against the shoulder 25 and controls communication between the channel 26 and chamber B around the edge of wall 27, while the central portion of said flexible plate forms a flexible valve seat portion 46 for the valve head 37 to coact therewith and seal or control communication between chambers A and B through exhaust openings 40, 44 and channel 43.

The booster unit shown in the two embodiments of the invention is the same so that in describing the booster unit 7 attention is directed to Figs. 9 and 10 as well as Fig. 1. The booster unit comprises a pair of casing members 51 which have a greater length than vertical width and such booster unit readily fits in or below the vehicle frame. Each casing member comprises a flat side 52 with outwardly sloping walls therearound terminating in a flange 53.

One of the casing members 51 is provided with lugs 54 with which to permit attachment of the booster unit directly to the vehicle frame 8 as shown in Fig. 1 or to a bracket 54' or the like, as shown in Figs. 9 and 10. The casing members 51 are secured together with bolts 99 passing through said flanges 53 and clamp therebetween a diaphragm 55.

Said diaphragm is capable of considerable lateral movement into either casing and divides the enclosure formed thereby into two chambers C and D. Chamber C is exposed to the atmosphere by reason of a centrally disposed opening 56 through which rod 10 freely extends while chamber D is connected with the booster line 6 by any suitable connection as at 98. The rod 10, which in Fig. 1 is joined in the arm 15b of the rocker lever 15, extends through the opening 56 and diaphragm 55, and is secured to said diaphragm by a pair of nuts 57 which bear against washer plates 58 on opposite sides of the diaphragm. A spring 59 in chamber D bears against one flat side 52 and one of the washer plates 58 to urge the diaphragm in brake releasing position, that is, in the direction to reduce the volume of chamber C and extend the rod 10, and such spring 59 also tends to reduce chafing or vibration of the diaphragm 55.

Operation of the vacuum power control apparatus shown in Fig. 1 is as follows:

When the parts are in the position shown in Fig. 1 the brakes are in their normal or released position. The parts of the valve structure 1 are in the positions shown in Fig. 2; that is, the flap valve portion 45 of the flexible plate valve is seated over the channel 24 by reason of the sub-atmospheric pressure therein and the atmospheric pressure in chamber A, and the valve head 37 is clear of the flexible valve seat portion 46. The diaphragm 55 of the booster unit is in the position relative to the casing members shown in Fig. 10 and the rod 10 is extended therefrom.

When pressure is applied to the foot pedal 12, the lever 13 tends to fulcrum about its connection with the rocker lever 15 in a direction which will not at first move the rod 9 to the left as viewed in Fig. 1, but instead the lever 13 will be moved in a direction to straighten the lever 13 and rocker lever 15 and such movement will first operate the cross-shaft 16, lever arm 17 and brake rods 11 so that the brake bands will be moved into engagement with the brake drums and then continued movement of the rod 14 by applying pressure to foot pedal 12 will cause the upper end 13a of link 13 to be moved counter-clockwise about its connection with rocker lever 15 and thereby pulls the valve head 37 against its flexible valve seat portion 46, closing communication between chamber A and chambers B and D of the valve structure and booster unit respectively. Engagement of the valve head 37 with the flexible plate which, it should be noted, is applied adjacent the wall 27, tends to lift the marginal flap valve portion 45 of said flexible plate and thereby provides communication between the manifold line 5, the booster line 6, and chamber D of the booster unit. The resistance offered by reason of sub-atmospheric pressure or the creation of a partial vacuum within the channel 26 by the suctions of the engine connected in the manifold 5, together with the connection with brake pedal arm 12 through lever 13 permits the brake pedal arm 12 to exert sufficient pull on the brake rods 11 to take up all slack and bring the brake bands of the several wheels into contact with their drums before the flap valve portion 45 "cracks" or opens. This prepares the mechanical parts of the braking arrangement for the application of the vacuum power so that uneven application of the brakes is eliminated, and a smooth even braking application is obtained.

As the vacuum within the chamber D increases, the rod 10 is drawn into the booster unit, that is, to the right as viewed in Fig. 1, which turns the rocker lever 15 counter-clockwise and applies the brakes. This counter-clockwise movement of rocker lever 15 causes the lever 13 to fulcrum clockwise above in connection with the connecting rod 14 attached to the brake pedal which causes the rod 9 to move to the right as viewed in Figs. 1 and 2 or in a direction to close the communication between the manifold line and the booster line and to open the booster line to atmosphere. However, this contra-movement is arrested; that is, the equilibrium is reached when the vacuum in the chamber D of the booster unit reaches a value which is variable with or dependent upon the position of the brake pedal. The further the brake pedal is depressed the greater the vacuum created within the chamber D and the greater the force applied to the brake rods and brakes. Should there be leaks in the booster line or valve structure, the communication between the manifold line 4 and booster will be maintained, unless the amount of leakage should exceed the capacity of the manifold line, as the booster unit cannot act to shut off such communication with the manifold line until the vacuum chamber D is sufficient to cause the required movement of rod 10.

Release of the brake pedal permits spring 42 to urge the valve head 37 to its open position and the flexible valve portion 45 is immediately drawn onto the edge wall 27 by the vacuum created in channel 26 thereby immediately preventing further application of such vacuum around the edge of wall 27 and through chamber B and booster line 6 to the booster and then the valve head 37 is moved off from the valve seat portion 46 and thereby permitting the booster to be opened to the atmosphere through the openings 40, 44 and channel 43 so that the vacuum in the booster is thereby exhausted.

Should the vacuum power apparatus fail, the brakes are manually operative mechanically as the brake pedal is mechanically connected with the brake rods. The rod 9 merely moves to its left as viewed in Fig. 1 until the tension plate 41 engages the inner end of the sleeve 34 which projects into chamber A whereupon lever 13 acts as a variable fulcrum for said lever 15 which when so fulcrumed, pulls positively upon rocker lever 15.

From the foregoing it will be seen that during the first operation of applying the brakes that the link or lever 13 will be moved slightly upward at its free end to which the rod 9 is connected, but that such upward movement will not affect the valve structure 1 because such rod 9 is pivoted thereto as at 9'. This enables the valve structure 1 to be rigidly attached to the frame member 2 as shown in Fig. 1. However, in some installations the upper end 13a of link 13 may be connected directly to the valve stem or rod 9" and in such installations either a pivotal connection is interposed between the valve structure 1 and frame member 2 or the bar 3 is connected to such member 2 by a ball and socket joint means so as to compensate for the slight tilting movement that may be occasioned by operation of the link 13.

Attention is now directed particularly to Figs. 4-10. The arrangement here illustrated is particularly suited for trailer installation, but is not limited to such use. In this embodiment of the invention the manifold 5 is connected to a manifold line 61 having branches 62 and 63 respectively communicating with a hand control valve 64 and a so-called storage tank 65. The tank 65 is maintained with a sub-atmospheric pressure therein and the main manifold line 61, is equipped with a check valve 74 to prevent escape of the vacuum built-up in the tank 65 when the suction created within the manifold ceases as by the motor attached thereto stopping.

The tank 65 is connected through a storage line 66 with a relay valve means 67 which is connected by a control line 68 with the hand control valve 64. A main booster line 69 leads from the relay valve means 67 and is provided with branches 70 each of which leads to a booster unit 7. In this arrangement each booster unit is supported by a bracket 54' extending from the housing 72 or other suitable support adjacent the brake 73. The rod 10 of each booster unit is connected directly to a lever 71 protruding from the corresponding brake 73.

The hand control valve 64 and relay valve means 67 are in most respects similar to the hereinbefore described control valve structure 1, and the identical elements thereof are designated similarly to said control valve structure.

In the hand control valve 64, see Figs. 5 and 6, a cover 81 is substituted for the cover 22, a stem 82 replaces the stem 9'', and valve 83 replaces valve head 37. The cover 81 is provided with a centrally disposed bore through which the stem 82 is slidably received. Said stem 82 extends through the flexible portion of plate 33 and is provided with a pair of washers 84 having convex confronting surfaces between which is mounted the valve 83 which is in the form of a flat, yieldable metallic plate, but having some degree of stiffness. Said valve 83 coacts with the flexible plate 33 in a manner similar to the first described structure but with certain differences to be hereinafter brought out.

The outer portion of the stem 82 is provided with a socket 150 which is intersected by a laterally directed diametrically disposed slot 151 through which extends a cross pin or cam riding pin 85. The extremity of the stem 82 is enlarged and externally threaded to receive a regulator knob 86 having an internally threaded socket 152 and a centered stop pin 87 projecting from said knob 86 through socket 152 and into the stem 82 and against the cross pin 85. The cover 81 is provided with a bearing portion 88 slotted to receive the cam riding pin 85 and about which is journalled cam ring 89 having a pair of helical cam surfaces 90 at its axially outer side which extend almost 180 degrees terminating in stop lugs 91 at their raised ends and recesses 92 at their lower ends adjacent lugs 91 as shown best in Fig. 6. The protruding extremities of the cam riding pin 85 is urged against the cam surfaces 90 by the spring 42 so that engagement of the cam riding pin 85 with the cam, limits the inward or normal position of the valve 83 and flexible marginal valve 45, of the flexible partition 33. Adjustment of the regulating knob 86 raises and lowers the stem 82 for any given position relative to the cam ring 89; thus providing a simple and positive means to regulate the limits of action of the hand control valve on raising or lowering of the valve 83 and flexible plate 33.

The cam ring 89 is operated by a handle 93 which comprises a hand grip portion 153 and an inverted cup-shaped hub portion 94' which encloses the cam ring but exposes the stem 82 through opening 154; and regulating knob 86 is above the hub portion. Said hub portion is attached in fixed relation to the cam ring 89 by set screws 95 or the like.

The channel 26 of the hand controlled valve 64 is connected with the branch 62 of the manifold line 61 while chamber B communicates with the control line 68 leading to the relay means 67. A suitable vacuum gauge 156 is also connected with chamber B through the connection 155.

The relay valve means 67 differs over the first described control valve structure in that it is operated by suction rather than by rod 9. For this change, a cover 101 is substituted for the cover 22, a valve stem 102 is substituted for valve stem 9'', and the valve head 37' is preferably bowed or tapered from valve stem 102 toward its periphery slightly away from the flexible plate 33 and is provided around its outer periphery with a beaded rim 157 which is curved or rounded from the apex of the rim 157 to the outer periphery of the valve head 37' the purpose of which will be more fully hereinafter explained. Further, a flexible diaphragm 103 is interposed between the cover 101 and housing 21.

The valve stem 102 extends through the diaphragm 103 sufficiently to receive a nut and a tension washer 104. A spring 105 is interposed between the tension washer and cover 101, and a cushion sleeve 106 is positioned between the diaphragm 103 and the tension plate 41.

The interior of cover 101 which forms an additional chamber E communicates with the control line 68 while channel 26 communicates with the storage line 66, and hence with the manifold line; the chamber B communicates with the main booster lines.

In brief both the hand control valve and relay valve means, like the control valve structure have chambers A and B as well as channel 26, but in the relay valve means, chamber A is divided and an additional chamber E is formed in the cover 101. Their differences lie principally in their means of actuation; that is, the hand control valve regulates the flow of air between chambers A and B and channel 26 by a hand lever and cam action in place of the link and lever and rod action of the control valve structure; while the relay valve means is controlled by air pressure to regulate flow of air between said chambers A and B and channel 26.

With the above in mind, operation of the apparatus disclosed in Fig. 4 is as follows:

Assuming that there is a sub-atmospheric pressure in the tank 65 and the brakes are released, the relay valve means will be in the position shown in Fig. 8, but the hand controlled valve will be arranged with the flexible valve portion 45 seated over the channel 26 and the valve 83 will be away from plate 33 and in "open position", contrary to the partially open position of the channel 26, as shown in Fig. 5. Upon turning the handle 153 to raise the valve 83, the condition shown in Fig. 5 will obtain; that is, this will cause upward movement of the valve 83, seating said valve 83 against its flexible seat 46 to seal the main booster line 68 from the atmosphere through exhaust ports 40, and thereafter open the main booster line, its branches and chambers D of the several booster units to the negative pressure present in the storage tank, by raising the valve 83 to close exhaust port 40 and thereafter raise valve 82 from its valve seat portion at the inner periphery of wall 27 and then communication will be established between storage tank 65, control line 66, and to chamber B in hand control valve 64 and to chamber E in the relay means.

Now, attention is called to the fact that the valve 83 is yieldable, so that it tends to yield to atmospheric pressure in chamber A upon the flexible valve portion 45 whereby said valve portion may seat on wall 27 while the valve 83 remains closed. As the valve 83 is raised in response to movement of the handle 93 and cam ring 89 greater effort is required to close the flexible valve 46 and greater will be the vacuum in the chamber E. This variation in the degree of vacuum in chamber E as controlled by the handle 93 causes a corresponding variation in the degree of vacuum in the several booster units in order to seat the flexible valve 46 in opposition to vacuum force or pull applied to diaphragm 103. That is, there occurs a balancing of pressures in chambers E and B of the relay valve means and a degree of vacuum is maintained in the booster units corresponding to the degree of vacuum in chamber E as controlled by the position of handle 93.

The yieldable valve 83 also provides means whereby the vacuum or sub-atmospheric pressure applied to the chamber E in the remote control valve when the control line 68 is connected to such chamber E, or the vacuum built-up in chamber D when the control line 68 is connected directly to such chamber instead of to the chamber E as is contemplated by this invention, will be maintained at a uniform degree or pressure because when the vacuum built-up in chamber B in the hand control valve 64 by the suction in the manifold 5 reaches a predetermined degree the flexible valve portion 45 may be drawn against its seat 27 thereby preventing the building up of greater sub-atmospheric pressure in the chambers E or D, as the case may be, and the yieldable valve 83 will permit such valve portion 45 to close the channel 26 and still close the exhaust ports 40 and 41, thereby maintaining the pressure built-up in the chambers D and E at a uniform degree and in the event the pressure in chambers D and E for any reason falls below that pressure controlled by the hand valve, the valve portion 45 will be opened automatically due to the differences in pressures and again connect the suction of the manifold or tank 65 to the chambers D or E through the chamber B.

In practice the storage tank 65, relay valve means 67 and booster units and connecting lines are mounted on the trailer, while the hand control valve 64 is mounted on a suitable support, such as the dash board 160. If desired, the relay valve may be omitted and the main booster line 69 connected directly to the hand control valve in place of the line 68.

By having the valve head 37 tapered from the valve stem 102 towards the periphery of the valve head 37' and providing such periphery with a beaded rim 157 the valve when moved to open position will conform to the convexity of the valve member 33 and maintain the exhaust openings in closed position and the curved or rounded edge 158 of the valve head 37' recedes from the flexible plate 33 and such construction has been found to effectively prevent fluttering of valve 33 when in the open position thereby eliminating the likelihood of objectionable noises common in valves heretofore. The outer periphery of the valve head 37' just clears an inward projection 148 that extends from the wall 27 into chamber B and such periphery just passes such projection 158 when the exhaust openings 40, 41 are closed and such construction permits immediate and freer flow past the valve head 37'.

The tension washer 104 may be varied both as to thickness and diameter to further control the operation of the valve by creating more weight to be raised by the vacuum or to increase and decrease the area of the diaphragm 103 which may be exposed to action of the vacuum. The boss 39' which spaces the valve head 37' from the valve plate 33 is also varied in thickness that is in its spacing attributes, depending upon the diameter of the flexible plate 33. It has been found that as the diameter of plate 33 increases the thickness of boss 39' should be increased so as to provide proper time intervals in the action of the various parts.

It will be apparent from the foregoing that as the valve stems 34, 82 and 102 are moved upwardly or outwardly of the housing that the exhaust ports are first closed and further opening movement in the same direction of such valve stems opens the intake to the vacuum; and as said valve stems are moved inwardly of the housing the inlet is first closed and further movement of the valve stems in such latter direction will then open the exhaust ports and permit the vacuum to be exhausted.

I claim:

1. In a vacuum power control apparatus for vehicles, a valve housing; a floating partition positioned within said housing to define therewith a central port and an annular port on one side of the partition and an atmosphere exposed chamber on the other side thereof; a valve head in said central port; a stem therefor extending through said partition; said floating partition being flexible and comprising a ported central portion covered by said valve head, a flexible valve seat portion coactive with said valve head to control fluid transfer from said central port to said atmosphere exposed chamber, and a freely flexible peripherial valve portion controlling communication between said annular port and said central port; said atmosphere exposed chamber being cylindrical in form and having radially directed atmosphere ports therein; a cylindrical member within said chamber and correspondingly ported, and a screen on said spacer member covering the ports therein.

2. In a vacuum power control apparatus for vehicles, a valve housing adapted to be attached in a fixed position to a vehicle frame; a floating partition positioned within said housing to define therewith a central port and an annular port on one side of the partition and an atmosphere exposed chamber on the other side thereof; a valve head in said central port; a stem therefor extending through said partition; said floating partition being flexible and comprising a ported central portion covered by said valve head, a flexible valve seat portion coactive with said valve head to control fluid transfer from said central port to said atmosphere exposed chamber, and a freely flexible peripherial valve portion controlling communication between said annular port and said central port; means operable through said stem for seating said valve head against said valve seat portion, said means being further operable through said valve head and seat to open said peripherial valve portion; said valve head being semi-flexible and responsive to pressure differences between the sides of said partition in opposition to said means.

3. In a vacuum power control apparatus for vehicles, a valve housing adapted to be attached in a fixed position to a vehicle frame including a first port in communication with a region of sub-atmospheric pressure, a second port in communication with a sub-atmospheric responsive device, and a chamber in communication with atmospheric pressure, a floatingly mounted flexible partition separating said ports from said chamber, including, a valve portion controlling fluid transfer between said ports, and a valve seat portion affording communication between said second port and said chamber; and a semi-flexible valve head coactive with said valve seat portion to control fluid transfer between said second port and said chamber, said valve head being operatively connected with said valve portion through said valve seat portion; means for operating said valve head to open said valve portion, said head being responsive to pressure differences between said ports and said chamber to permit closing of said valve portion in opposition to said means.

4. In a vacuum power control apparatus for vehicles, a valve housing; a partition positioned within said housing to define therewith a central portion and an annular port on one side of the partition and an atmosphere exposed chamber on the other side thereof; a valve head in said central port; a stem therefor extending through said partition; said flexible partition being flexible and comprising a ported central portion covered by said valve head, a flexible seat portion coactive with said valve head to control fluid transfer from said central port to said atmosphere exposed chamber, and a freely flexible peripherial valve portion controlling communication between said annular port and said central port; an expansible chamber including a flexible diaphragm connected with said stem; and means for varying the pressure in said expansible chamber to fluctuate said diaphragm and valve stem to actuate said valve stem.

5. In a vacuum power control apparatus for vehicles, a valve housing; a floating partition and a diaphragm positioned within the housing there being defined by the diaphragm and housing an expansible chamber; by the partition and housing a central port and an annular port, and by and between said partition, diaphragm and housing an atmosphere exposed chamber, the central portion of said partition forming a flexible valve seat means for said central port, and a peripherial portion of said partition forming a flap valve means for said annular port, a valve head arranged to coact with said valve seat means to control said central port and to actuate said flap valve means through said valve seat means, means connecting said valve head with said diaphragm; and means for varying the pressure in said expansible chamber to fluctuate said diaphragm and actuate said valve.

6. In a vacuum power control apparatus for vehicles, a valve housing; a floating partition positioned within said housing to define therewith a central port and an annular port on one side of the partition and an atmosphere exposed chamber on the other side thereof; a valve head in said central port; a stem therefor extending through said partition; said floating partition being flexible and comprising a ported central portion covered by said valve head, a flexible valve seat portion coactive with said valve head to control fluid transfer from said central port to said atmosphere exposed chamber; and a freely flexible peripheral valve portion controlling communication between said annular port and said central port; and a fluid pressure responsive means in said housing connected with said stem to actuate said valve head whereby the said fluid pressure in said central port is maintained normally balanced against the said fluid pressure responsive means.

7. In a vacuum power control apparatus for vehicles, a valve housing; a floating partition positioned within said housing to define therewith a central port and an annular port on one side of the partition and an atmosphere exposed chamber on the other side thereof; a valve head in said central port; a stem therefor extending through said partition; said floating partition being flexible and comprising a ported central portion covered by said valve head, said portion coactive with said valve head to control fluid transfer from said central port to said atmosphere exposed chamber; and a freely flexible peripherial valve portion controlling communication between said annular port and said central port; a cam rider carried by said stem in said housing; a cam means journalled concentrically with respect to said stem and having a helical cam face engageable with said cam rider to shift said stem axially and effect movement of said valve head.

8. In a vacuum power control apparatus, a housing, a chamber in said housing normally open to the atmosphere; an outlet chamber in said housing adapted to be connected to a remote point; an inlet chamber surrounding said outlet chamber and having a seat portion interposed therebetween, a floating flexible valve member interposed between said outlet chamber and said atmosphere chamber and adapted to normally close said inlet chamber; there being openings through said floating valve member normally connecting said outlet chamber to said atmosphere chamber; a flexible valve head normally spaced from said floating valve member and below said seat portion; means to normally urge said valve head below said seat portion and to normally urge said floating valve member toward said seat member; means to adjust said valve head relative to said valve seat; and means to move said valve head to close the openings through said floating valve member and to raise said floating valve off from said seat portion to permit communication between said inlet chamber and said outlet chamber and to prevent communication between said inlet and outlet chambers and said atmosphere chamber.

9. In a vacuum power control apparatus, a housing, a chamber in said housing normally open to the atmosphere; an outlet chamber in said housing adapted to be connected to a remote point; an inlet chamber surrounding said outlet chamber and having a seat portion interposed therebetween; a flexible valve member interposed between said outlet chamber and said atmosphere chamber and adapted to normally engage said seat portion to prevent communication between said inlet chamber and said outlet chamber; a diaphragm connected to said housing and separating said atmosphere chamber from said housing and providing an additional chamber therein; a valve head normally spaced from said flexible valve member and tapered from its center towards its periphery and away from said flexible valve member; means connecting said valve head to said diaphragm; there being openings through said flexible valve member normally connecting said atmosphere chamber and said outlet chamber; means connected to said additional chamber to flex said diaphragm and to move said valve head to close said openings in said flexible valve and to raise said flexible valve off from said seat so as to permit communication between said inlet chamber and said outlet chamber.

10. In a vacuum power control apparatus for vehicle brakes; a booster unit connected to operate said brakes and having a chamber responsive to sub-atmospheric pressure variation; a region of sub-atmospheric pressure; means to control the application of said pressure; a control valve connected to said region of sub-atmospheric pressure and including a housing having an outlet chamber connected to the chamber in said booster unit, an inlet chamber of lesser area than said outlet chamber connected to said region of sub-atmospheric pressure, a chamber connected to the atmosphere, a floating flexible valve member interposed between said outlet chamber and said atmosphere chamber and adapted to normally close communication between said inlet chamber and said outlet chamber, a diaphragm connected to said housing and separating said atmosphere chamber from said housing and providing an additional chamber therein, said additional chamber being connected to said region of sub-atmospheric pressure subject to control of said means controlling the application of said pressure; and means whereby a sub-atmospheric pressure applied in said additional chamber will be automatically maintained in said outlet chamber and the chamber in said booster unit in substantially the same amount as that applied in said additional chamber.

11. In a vacuum power controlled apparatus for vehicles, a valve housing, a flexible partition and a diaphragm positioned within the housing there being defined by the diaphragm and housing an expansible chamber, by the partition and housing a central port and an annular port, and by and between said partition, diaphragm and housing an atmosphere exposed chamber, the central portion of said partition forming a flexible valve seat means for said central port, and the peripheral portion of said partition forming a flap valve means for said annular port, a valve head arranged to coact with said valve seat, means to control said central port and to actuate said flap valve means through said valve seat means, means connecting said valve head with said diaphragm and means for varying the pressure in said expansible chamber to fluctuate said diaphragm and actuate said valve.

ALBERT E. ROY.